W. C. BRINTON, Jr.
ELECTRICAL CONDENSER AND PROCESS OF MAKING SAME.
APPLICATION FILED MAR. 23, 1916.

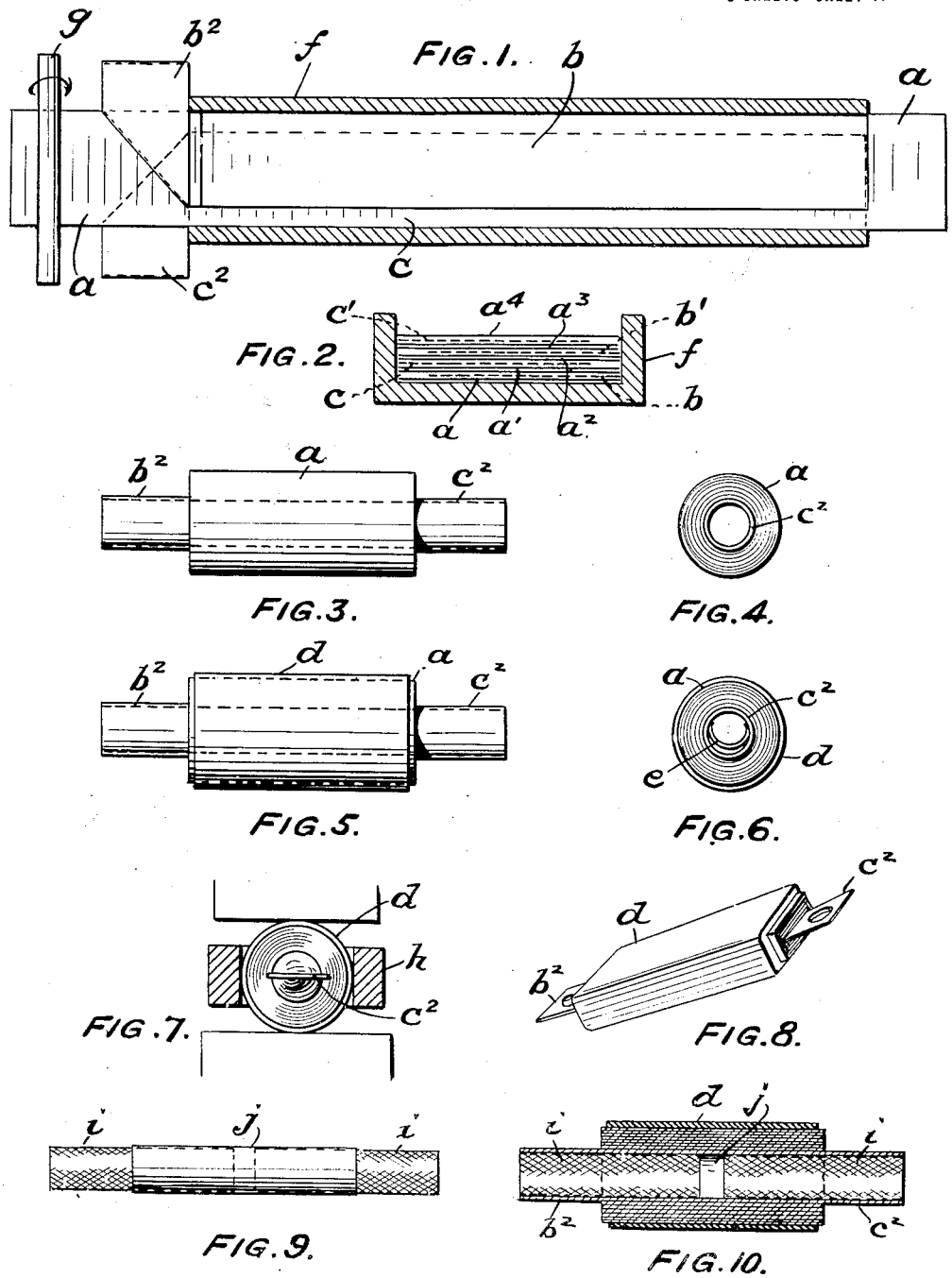

1,237,015.  Patented Aug. 14, 1917.
5 SHEETS—SHEET 2.

WITNESS:
Rob't P. Kitchel

INVENTOR
William C. Brinton, Jr.
BY
Frank L. Busser
ATTORNEY.

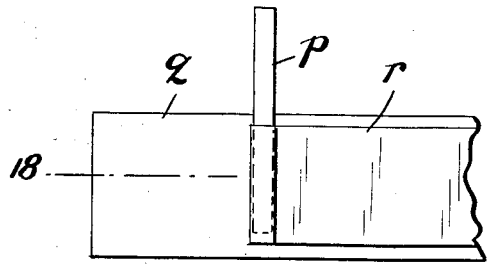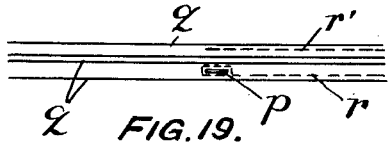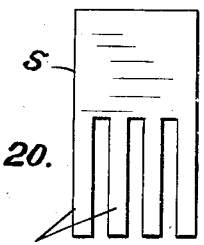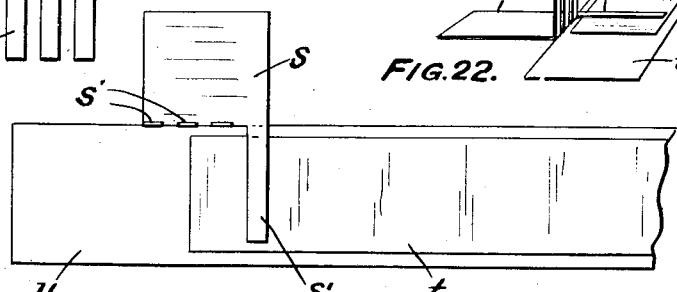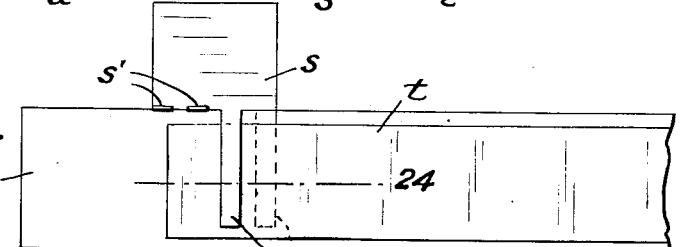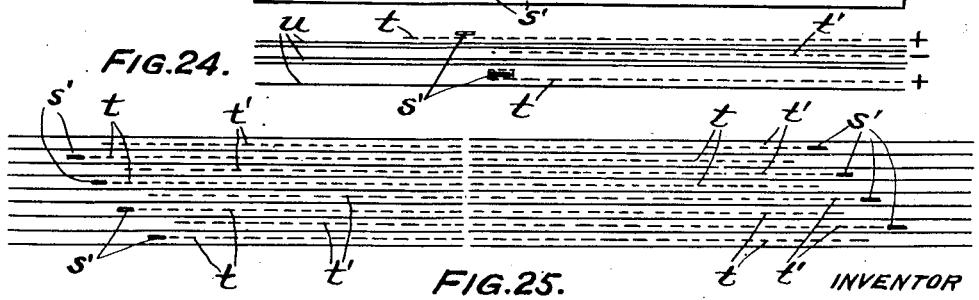

W. C. BRINTON, Jr.
ELECTRICAL CONDENSER AND PROCESS OF MAKING SAME.
APPLICATION FILED MAR. 23, 1916.

1,237,015.

Patented Aug. 14, 1917.
5 SHEETS—SHEET 4.

WITNESS:

INVENTOR
William C. Brinton, Jr.
BY
Frank S. Busser
ATTORNEY.

W. C. BRINTON, Jr.
ELECTRICAL CONDENSER AND PROCESS OF MAKING SAME.
APPLICATION FILED MAR. 23, 1916.

1,237,015.

Patented Aug. 14, 1917.
5 SHEETS—SHEET 5.

WITNESS:
Rob't R. Mitchel

INVENTOR
William C. Brinton, Jr.
BY Frank S. Busser
ATTORNEY.

UNITED STATES PATENT OFFICE.

WILLIAM C. BRINTON, JR., OF KENNETT SQUARE, PENNSYLVANIA, ASSIGNOR TO PHILIPS-BRINTON COMPANY, OF KENNETT SQUARE, PENNSYLVANIA, A CORPORATION OF PENNSYLVANIA.

ELECTRICAL CONDENSER AND PROCESS OF MAKING SAME.

1,237,015.     Specification of Letters Patent.     Patented Aug. 14, 1917.

Application filed March 23, 1916. Serial No. 86,235.

*To all whom it may concern:*

Be it known that I, WILLIAM C. BRINTON, Jr., a citizen of the United States, residing at Kennett Square, county of Chester, and State of Pennsylvania, have invented a new and useful Improvement in Electrical Condensers and Processes of Making Same, of which the following is a full, clear, and exact description, reference being had to the accompanying drawings, which form a part of this specification.

The object of my invention is to devise a process whereby may be produced an electrical condenser wherein the layers of paper or other dielective material and metal foil or other conducting material will be permanently maintained in the close and intimate relationship required to effectually exclude moisture.

Various steps of different specific processes embodying my invention for the production of various forms of condensers embodying my invention are shown in the accompanying drawings, in which—

Figure 1 is a plan view showing the first stage of manufacture of one form of condenser. Fig. 2 is a cross-section through Fig. 1. Fig. 3 is a view of the same condenser immediately after it is wound upon a mandrel. Fig. 4 is a cross-sectional view of the same. Fig. 5 is a view of the same condenser after application thereto of the cylindrical metallic casing. Fig. 6 is a cross-sectional view of the same. Fig. 7 is a cross-sectional view of the die or press with the condenser of Figs. 5 and 6 placed therein. Fig. 8 is a perspective view of the completed condenser.

Fig. 9 is a longitudinal view of two wire gauze fillers which may be substituted for the filler shown in Fig. 6. Fig. 10 is a longitudinal sectional view of the fillers of Fig. 9 inserted within a condenser.

Figure 15:
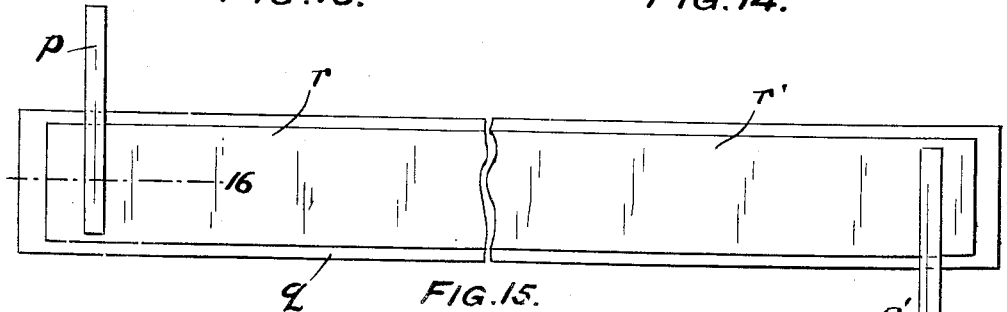
Figure 16:
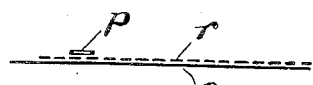

Fig. 15 is a plan view showing the first stage of manufacture of another modified form of condenser. Fig. 16 is a diagrammatic longitudinal edge view of a part of Fig. 15. Fig. 17 is a view similar to Fig. 15 showing the next stage of manufacture of the same condenser. Fig. 18 is a diagrammatic longitudinal edge view of a part of Fig. 17. Fig. 19 is a view, similar to Fig. 18, showing the manufacture of the condenser still further advanced.

Fig. 20 is a plan view of a modified construction of lead. Fig. 21 is a plan view showing the application of the lead of Fig. 20 to the manufacture of another modification. Fig. 22 is a perspective view of Fig. 21. Fig. 23 is a view, similar to Fig. 21, showing a more advanced stage in the manufacture of the same condenser. Fig. 24 is a diagrammatic edge view of a part of Fig. 23. Fig. 25 is a view, similar to Fig. 24, of the same condenser in a still more advanced stage of manufacture.

Figure 26:
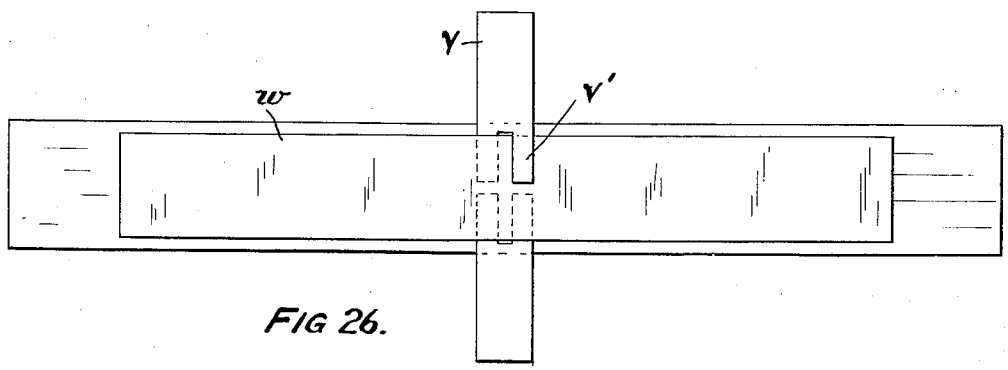

Fig. 26 is a plan view, similar to Fig. 21, but illustrating an early step in the manufacture of another modification.

Figure 27:
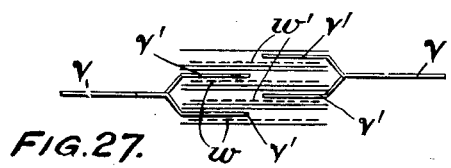

Fig. 27 is a diagrammatic cross-sectional view of Fig. 26.

Figure 28:
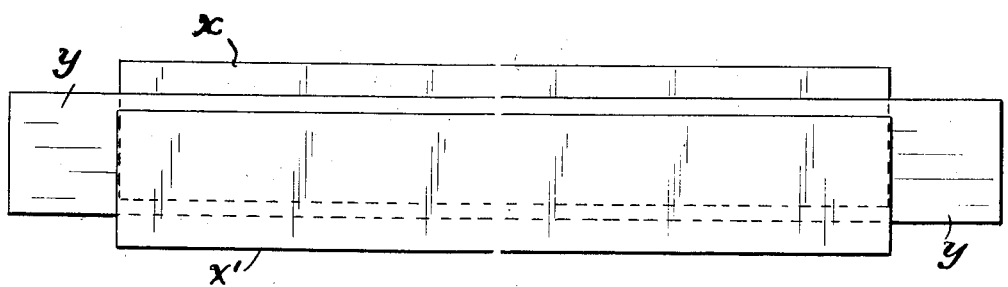
Figure 29:
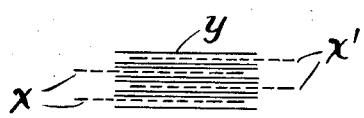
Figure 30:
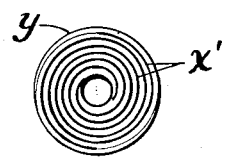

Fig. 28 is a plan view of an early stage in the manufacture of a condenser with the paper and foil differently arranged. Fig. 29 is a diagrammatic cross-sectional view of Fig. 28. Fig. 30 is an end view of the completed condenser, before the application of the casing.

Figure 31:
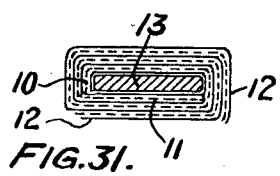

Fig. 31 is a cross-section through a condenser, in process of manufacture, similar to any of those hereinbefore shown, but wound on a flat mandrel.

Figure 32:
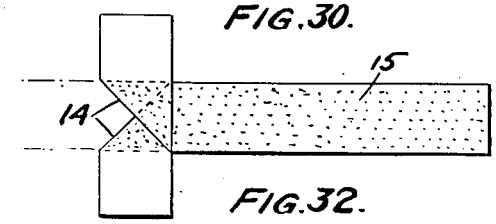
Figure 33:
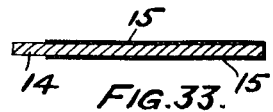

Fig. 32 is a plan view of an early stage in the manufacture of a condenser in which for paper is substituted a dielectric coating applied as a fluid to the metal foil. Fig. 33 is an enlarged longitudinal section through the end of the metal foil of Fig. 32.

Figure 34:
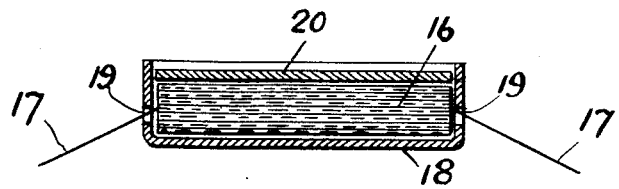
Figure 35:
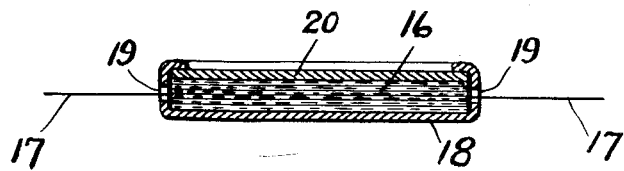
Figure 36:
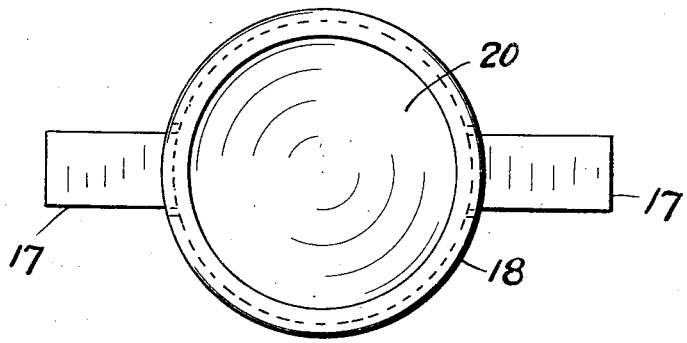
Figure 37:
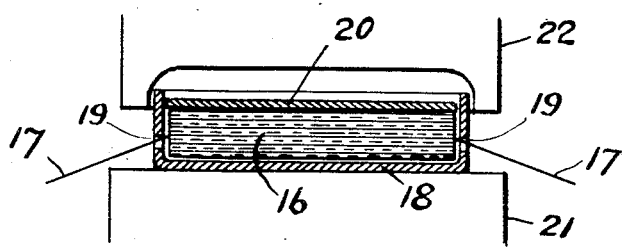

Fig. 34 is a sectional view of another modified form of condenser in process of manufacture. Fig. 35 is a similar view of the same condenser completed. Fig. 36 is a plan view of the condenser of Fig. 35. Fig. 37 is a sectional view showing the die employed in compressing and crimping the structure of Fig. 34 to form the completed structure of Fig. 35.

In describing the above condenser and processes of making same, I shall also refer to certain instrumentalities that I prefer to employ but which are not part of the invention.

I take a channel $f$, like that shown in Fig. 1, which has a flat bottom, straight sides and open top and ends, and lay therein a strip $a$ of paper or other equivalent dielectric which may be of the character heretofore employed in condensers. This strip is of about the width of the channel and should project substantially beyond the channel especially at what, for convenience, I shall call the front thereof, namely, the left hand end of Fig. 1. On top of the strip $a$ I lay a strip $b$ of tin foil, aluminum foil, or other equivalent conductor, adapted to form the positive and negative elements of the condenser, which material I shall, for convenience, designate metal foil. This strip $b$ is of less width than the channel and strip $a$ and is applied in such position that one longitudinal edge thereof alines with, or is relatively close to, one longitudinal edge of the paper strip, while the other longitudinal edge thereof is at a substantial distance from the other longitudinal edge of the paper strip. The strip $b$ should also project substantially beyond the front end of the channel. Upon the strip $b$ is placed another dielectric formed of two paper strips $a'$, which should be of the dimensions of the lower strip $a$ and similarly positioned. Upon the dielectric $a'$ is placed another metal foil strip $c$, which should be of the dimensions of strip $b$, and similarly but reversely positioned; that is, it should aline with, or extend relatively close to, that longitudinal edge of the channel opposite the longitudinal edge with which the strip $b$ alines. Upon the strip $c$ should be placed another dielectric formed of two strips $a^2$, which should be of the dimensions of strips $a$ and $a'$ and similarly positioned. If desired, other metal foil strips $b'$ and $c'$ and other dielectrics $a^3$ and $a^4$ may be superposed. The top as well as the bottom dielectric may be a single strip of paper, which in the subsequent formation will bring a double thickness of paper between each strip of foil. The reason for this is to insure there being complete insulation between the strips of foil, even though there be occasional flaws in the paper.

It will be understood that the metal foil strips $b$ and $b'$ form (say) the positive elements of the condenser and the metal foil strips $c$ and $c'$ the negative elements thereof.

The ends of the metal foil strips are then bent at right angles to the direction of their extension so as to extend substantially beyond the longitudinal edges of the paper strips, strips $b$ and $b'$ being bent to project at one side and strips $c$ and $c'$ being bent to project at the other side. Preferably, the front ends of the metal strips are bent upon themselves before being bent laterally so as to accord a desirable thickness of material in the laterally projecting ears, which are lettered respectively $b^2$ and $c^2$.

The built-up structure is then wound upon a mandrel $g$, the side walls of the channel preventing the strips from being deflected laterally during the rolling operation.

The resultant structure is shown in Figs. 3 and 4.

Upon the cylindrical shaped condenser is then placed a deformable casing $d$, preferably of steel, and within the hollow core of the condenser is slipped a piece of cotton duck or other suitable filler $e$. The casing $d$ should be of somewhat less length than the cylindrical body which it incloses. The resultant structure is shown in Figs. 5 and 6. The condenser should then be impregnated with wax, in the manner and for the purpose well known in the art.

The mandrel $g$ is then removed and the ears $b^2$ and $c^2$ flattened out by hand. The condenser is then placed in a die member $h$ shown in Fig. 7 and pressed into the form shown in Fig. 8. The side walls of the die are spaced apart a distance about equal to the diameter of the condenser and should be of such height that when the condenser is inserted it projects above and below these walls to an equal extent. By means of the upper and lower die members the condenser is flattened into the form shown in Fig. 8. The ears or "leads" $b^2$ and $c^2$ may then be orificed and a connection made to each conductor wire by means of a washer and screw.

In the foregoing structure, not only are the paper and metal foil layers of the condenser caused to be pressed flat against each other, but the rigid metal casing maintains that relationship permanently, preventing subsequent distortion of the condenser and the entrance of moisture, which is so common a source of inefficiency and unreliability in the condensers now in use.

Figure 13:
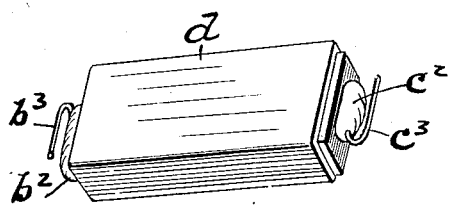
Fig. 13 is a perspective view of another modified form of condenser.

The construction just described is the one best adapted to the use of aluminum foil. Where tin foil is used, I prefer to omit the cotton duck filler and melt down the tin and solder the wires $b^3$ and $c^3$ thereto, as shown in Fig. 13.

In Figs. 9 and 10, instead of a cotton duck filler $e$, I show two cylindrical shaped pieces of wire gauze $i$ inserted into and projecting from opposite ends of the condenser and united by a similarly shaped paper strip $j$. These are pressed down with the ears $b^2$ and $c^2$ and serve to naturally strengthen them.

Figure 11:
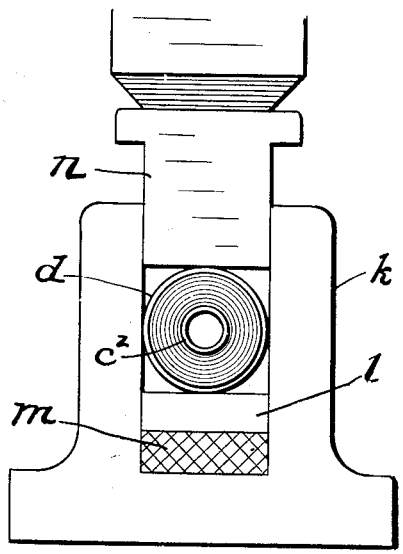
Fig. 11 is an end view of a modified form of die or press.
Figure 12:
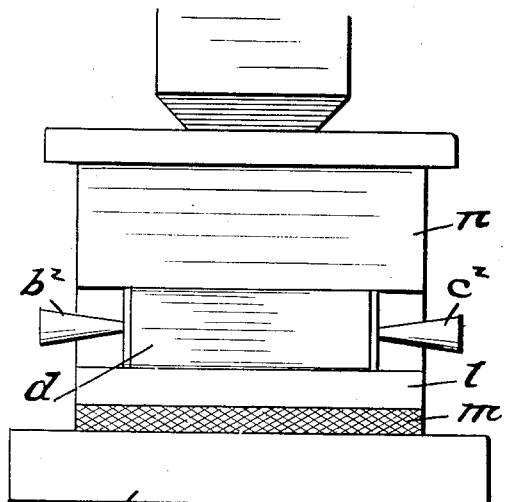
Fig. 12 is a longitudinal view, partly cut away, of the same.

In Figs. 11 and 12 a modified form of die is shown. This die comprises a main body $k$ having parallel side walls and a rigid bottom, a rigid base plate $l$ resting upon an elastic plate $m$, and a plunger $n$. The condenser, to which, as above stated, the metal casing $d$ is applied before the final shaping, will be flattened symmetrically in this die, by reason of the provision of the elastic backing $m$ for the base of the die.

Figure 14:
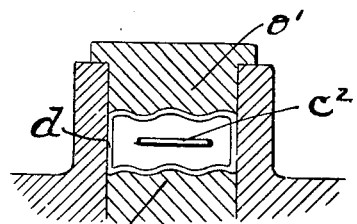
Fig. 14 is a cross-sectional view of another form of die or press for imparting a different shape to the condenser.

For the purpose of further strengthening the condenser, the same may be compressed, as shown in Fig. 14, between two die members $o$ and $o'$ whose opposing faces are corrugated, thereby imparting a similar shape to the casing and its contained layers. Wherein, in the claims, I speak of flattening the condenser, I intend to comprehend the form in which the opposing surfaces, although corrugated, or otherwise shaped, are flattened relatively to a cylindrically shaped condenser.

In Figs. 15–19 I show the first steps in the manufacture of a modified condenser. The ears or leads to be connected with the respective conductor wires are shown as flat metal strips $p$, $p'$, which are applied crosswise, one to one end of one strip of foil $r$ and the other to the other end of the other strip of foil $r'$. The strips of foil are each inclosed between two strips of paper $q$. The foil is wound around the strips, as shown in Figs. 17 and 18, before the foil and paper are wound into a roll. Preferably the foil is narrower than the paper, which overlaps the foil on both edges. To the paper and foil, after being rolled as shown in Figs. 3 and 4, is applied a deformable metal casing, as shown in Figs. 5 and 6, which is compressed within a die, as shown in Fig. 7 or in Figs. 11 and 12; the conductor wires then being attached respectively to the strips $p$ and $p'$ projecting from opposite ends thereof.

Where the condenser consists of a relatively large number of strips of foil and paper, I may proceed as shown in Figs. 20–25. Instead of a single strip $p$ or $p'$, I take two flat plates $s$ each cut away to form fingers $s'$. Eight layers of foil are alternated with paper layers $u$. The strips of foil $t$ alternate with the strips of foil $t'$. The fingers $s'$ of one plate are connected with the strips $t$ at one end of the pile, while the fingers of the other plate are connected with the strips $t'$ at the other end of the pile, the two plates extending from opposite sides of the strips, similar to the arrangement of $p$, $p'$ in Fig. 15. The strips of foil and paper are wound into a roll, which is slipped within a casing, and the whole compressed, as hereinbefore described. The conductor wires are attached respectively to the solid parts of the two plates $s$.

In Figs. 26 and 27, the principle of construction is the same as in Figs. 20–25 except that the fingers $v'$ of the plates $v$ are applied to the conductors $w$ and $w'$ midway of their length. This construction is of advantage in that the length of the path of travel of the current is reduced one-half.

In Figs. 28–30, there are employed no separate leads, nor is the foil bent out as in Fig. 1, but instead each strip of foil $x$ or $x'$ is made sufficiently wide so that its edges project a substantial distance beyond one edge or the other of the adjacent strip of paper $y$. After the strips are rolled into shape and pressed, the projecting parts of the foil at opposite ends are in the shape of a spiral as shown in Fig. 30 and may be soldered or otherwise secured together, for example, as shown in Fig. 13.

The paper and foil need not be rolled upon a cylindrically shaped mandrel. They may be rolled upon a flat mandrel, as in Fig. 31, wherein 10 and 11 represent two sheets of foil and 12 strips of paper, all superimposed and wound about a flat mandrel 13. The shape of the metal casing into which the rolled strips are placed would of course correspond to the contour of the roll, and the incased roll is pressed between die members as before described, which serve to condense the layers, and hold them permanently into their desired relationship.

It is not necessary that the conducting material and the dielectric material should be solids. Thus, instead of paper, I may substitute a coating of shellac or other dielectric material applied to the metal foil. In Fig. 32, I show two strips of foil 14, each of which is coated on both sides with a layer of shellac 15 except at its extreme ends, which are bent out, as shown also in Fig. 1, to form material for the leads.

In Figs. 34–37, I show still another form of condenser which differs from those hereinbefore described principally in the way in which the layers of foil and paper are built up and in the employment of a deformable metal casing of two parts. Instead of spirally winding a number of alternately arranged sheets of foil and paper, I provide disks of foil and paper, which disks may be of any shape, preferably circular as shown, and which are superimposed one upon another to form a pile 16. The pile, to which leads 17 are integrally or otherwise attached, in any of the ways hereinbefore described, is set into an open-topped box-like casing 18, of rigid but deformable material conforming in shape to the pile, but of greater diameter. The wall of the casing should be provided with orifices 19 for the leads to project through and also for the escape of the wax forced out in the compression operation. Upon the pile is placed a disk 20, which fits within the casing rather neatly.

The structure is placed on a base 21, and a die 22 is applied, which forcibly compresses and consolidates the sheets of paper and foil and also compresses the same between the bottom of the casing and the disk 20, at the same time crimping the upper edge of the wall of the casing inwardly and downwardly against the disk, thereby pressing the whole into a solid unit.

It is characteristic of all the forms of my invention that not only are the layers of foil and paper consolidated by external pressure, but that the metal casing is consolidated with the layers of foil and paper by the same external pressure, thus permanently maintaining the layers of foil and paper in their desired tight relationship and permanently maintaining the casing in tight contact with the outer surface of the roll, whereby the entry of moisture between the layers is effectually prevented.

Having now fully described my invention, what I desire to protect by Letters Patent is:

1. The process of making incased electrical condensers which consists in arranging layers of conducting material and dielectric material to form the condenser body, applying thereto a casing of deformable material conforming in shape to the condenser body, and subjecting the casing throughout its periphery from end to end to pressure to effect a substantial reduction in the volume of the condenser, thereby pressing the layers of conducting material into tight contact with adjacent layers of dielectric material and the casing and its contents into tight contact with each other, thus permanently maintaining the said layers in their desired relationship and effectually excluding the entry of moisture between the layers.

2. The process of making incased electrical condensers which consists in arranging layers of conducting and dielectric material and winding them in circular form to form a cylindrical condenser body, applying thereto a cylindrical casing of deformable material, and subjecting the casing to pressure along radial lines to convert the cylindrical condenser into a polygonal condenser having a substantially decreased volume, thereby pressing said layers into tight contact with each other and the casing and its contents into intimate relationship.

3. The process of making incased electrical condensers which consists in arranging layers of conducting material and dielectric material to form the condenser body, applying thereto a casing of deformable material conforming in shape to the condenser body and completely inclosing the same except at its ends, and subjecting the casing to pressure in opposite directions while restraining its expansion at right angles to the direction of pressure.

4. The process of making incased electrical condensers which consists in arranging layers of conducting and dielectric material and winding them in circular form to form a cylindrical condenser body, applying thereto a cylindrical casing of deformable material, and subjecting the casing to pressure in opposite radial directions while restraining its expansion at right angles to the direction of pressure, thereby forming a rectangular condenser whose width substantially equals the diameter of the original cylindrical condenser and whose thickness is substantially less than its width.

5. An electrical condenser comprising spirally arranged layers of conducting material and dielectric material forming the container body and a tubular container of deformable material inclosing the condenser body execept at the ends, the same being formed into a solid unit of oblong cross-section in which said layers are pressed into intimate contact with each other and all the inner walls of the casing are pressed into intimate contact with the container body.

6. An electrical condenser comprising a rigid casing and contained layers of conducting material and dielectric material forming the condenser body, said casing being of deformable material and inclosing the condenser body except at its ends, said layers being pressed together and held as a whole in intimate relation with the casing by inward pressure and distortion of the latter.

In testimony of which invention, I have hereunto set my hand, at Philadelphia, on this 14th day of March, 1916.

WILLIAM C. BRINTON, Jr.